3,404,070
PROCESS FOR CULTIVATING TRYPANOSOMES
Nina Georgievna Kljueva, Rita Vladimirovna Krzhevova, Riva Vulfovna Fradkina, Natalia Nikolaevna Sukhareva, Georg Solomonovich Zilberblat, and Boris Moiseevich Parizh, Moscow, U.S.S.R., assignors to Gosudarstvenny Kontrolny Institut Meditsinskikh Biologicheskikh Preparatov im. L.A. Tarasevicha, Moscow, U.S.S.R.
No Drawing. Filed Apr. 13, 1965, Ser. No. 447,872
3 Claims. (Cl. 195—104)

ABSTRACT OF THE DISCLOSURE

Trypanosomes are cultivated by supplying air deeply within a culture layer at a rate of 1.5 to 2.5 parts by volume per hour to one volume of nutrient medium.

---

This invention relates to processes for cultivating trypanosomes with the use of nutrient media and air.

Processes for cultivating trypanosomes are known, wherein the trypanosomes are cultivated in thin layers of nutrient media with air penetrating only through the surface of the media.

These cultivation processes, however, restrict the possibility of obtaining the microbial mass in quantities sufficient for commercial production of vaccines, antigens, sera, etc., since due to poor aeration of the lower layers of the medium, the trypanosomes grow slowly and only in small volumes with insignificant accumulation of microbial cells per unit of the medium volume.

It is therefore expedient to develop a process for large-scale cultivation of trypanosomes.

Although such attempts were made in the past, none of them were successful, and prior to this invention no process for large-scale cultivation of trypanosomes had been developed.

An object of this invention is to provide a process for cultivating trypanosomes which makes it possible to produce the microbial mass in required quantities.

In accordance with the above and other objects this invention relates to a process for the large-scale cultivation of trypanosomes as described herein, and it will be understood that changes in the particular embodiment of this invention may be made without departing from the spirit and scope of the invention.

Other objects and advantages of the invention will be evident from the following description:

EXAMPLE

Trypanosomes are cultivated with active aeration in one- or two-phase peptone-yeast or caseine-yeast media.

*Composition of Medium 1 (the amounts of the ingredients are indicated per 1 l. of the medium)*

| | |
|---|---:|
| Peptone _____ml__ | 200 |
| Meat water (0.5 kg. of beef meat boiled in 1 l. of water) _____ml__ | 200 |
| Distilled water _____ml__ | 600 |
| Dry granulated blood _____g__ | 20 |
| $Na_2HPO_4 \cdot 12H_2O$ _____g__ | 3 |
| $KH_2PO_4$ _____g__ | 0.5 |
| Glucose _____g__ | 10 |
| Vitamin $B_1$ _____g__ | 0.05 |

*Composition of Medium 2 (the amounts of the ingredients are indicated per 1 l. of the medium)*

| | |
|---|---:|
| Caseine hydrolyzate _____ml__ | 400 |
| Meat water (0.5 kg. of beef meat boiled in 1 l. of water) _____ml__ | 400 |
| Distilled water _____ml__ | 200 |
| Dry granulated blood _____g__ | 20 |
| $CaCl_2$ _____g__ | 0.11 |
| $MgSO_4$ _____g__ | 0.2 |
| KCl _____g__ | 0.4 |
| $Na_2HPO_4 \cdot 12H_2O$ _____g__ | 3 |
| $KH_2PO_4$ _____g__ | 0.5 |
| Glucose _____g__ | 1 |
| Vitamin $B_1$ _____g__ | 0.05 |

The preparation of the medium in the reactors consists in preparing a solution of hematin by extracting the said hematin from dry granulated blood with alkaline water; sterilizing the obtained solution; adding phosphate buffer broth containing the other ingredients of the medium and repeatedly sterilizing the medium thus prepared. The medium is considered suitable for inoculation at a pH from 7.2 to 7.6. The inoculum should contain not less than 98 percent of trypanosomes in the crithidial stage (of which not more than 3 percent of deformed cells are allowed) and containing not more than 2 percent of trypanosomes in the leptomonad stage, at a concentration of the microorganisms in the culture of 40 million/ml. and more.

The inoculum is first cultivated in matrasses (also known as cucurbits which are chemical vessels in the shape of a gourd) and is then consecutively developed in vessels of a capacity of 5, 25, and 100 l. The culture obtained in a vessel of any of the indicated volumes serves as inoculum for reactors of similar and larger volumes.

The trypanosomes are cultivated at a temperature of 26° to 28° C. The gage pressure in the reactors is 0.3 to 0.4 atm. In the 100–500 l. reactors the trypanosomes are cultivated for 96 to 120 hours during which time the cell concentration increases from the starting 6–14 million/ml. to the final 50–60 million/ml.

Air is supplied into the depth of the culture layer at a ratio of 1.5 to 2.5 parts per hour to 1 part of nutrient by volume.

We claim:
1. A process for cultivating trypanosomes comprising introducing an inoculum containing 5 to 10 day old trypanosomes in the crithidial stage of development and having a concentration of at least $40 \times 10^6$ trypanosomes per ml. into a liquid nutrient medium containing nitrogen sources, growth factors, mineral salts, hematin and vitamin $B_1$ and cultivating said trypanosomes with air delivered into the liquid nutrient medium at a rate of from 1.5 to 2.5 volumes of air per hour per volume of nutrient medium, said innoculum being used in an amount providing a concentration of from $6 \times 10^6$ to $14 \times 10^6$ trypanosomes per ml. of nutrient medium.

2. A process as claimed in claim 1, wherein a single-phase liquid nutrient medium is used.

3. A process as claimed in claim 1, wherein a two-phase liquid nutrient medium is used.

References Cited

Johnson: Annual Review of Microbiology, vol. 10, pp. 206 to 209.

Weinman: Annals of the New York Academy of Science, vol. 56, art. 5, pp. 995 to 1003.

ALVIN E. TANENHOLTZ, *Primary Examiner.*